US012643427B2

(12) United States Patent
Ahtikari

(10) Patent No.: US 12,643,427 B2
(45) Date of Patent: Jun. 2, 2026

(54) METHOD FOR DETERMINING A STATUS OF AN ELECTRIC VEHICLE CHARGING STATION

(71) Applicant: Liikennevirta Oy / Virta Ltd, Helsinki (FI)

(72) Inventor: Jussi Ahtikari, Helsinki (FI)

(73) Assignee: Liikennevirta Oy / Virta Ltd, Helsinki (FI)

( * ) Notice: Subject to any disclaimer, the term of this patent is extended or adjusted under 35 U.S.C. 154(b) by 379 days.

(21) Appl. No.: 18/272,897

(22) PCT Filed: Jan. 20, 2022

(86) PCT No.: PCT/FI2022/050035
§ 371 (c)(1),
(2) Date: Jul. 18, 2023

(87) PCT Pub. No.: WO2022/157418
PCT Pub. Date: Jul. 28, 2022

(65) Prior Publication Data
US 2024/0083290 A1     Mar. 14, 2024

(30) Foreign Application Priority Data
Jan. 20, 2021     (FI) ..................................... 20215065

(51) Int. Cl.
*B60L 53/68*     (2019.01)
*B60L 53/66*     (2019.01)

(52) U.S. Cl.
CPC .............. *B60L 53/68* (2019.02); *B60L 53/66* (2019.02); *B60L 2260/50* (2013.01)

(58) Field of Classification Search
CPC ...... B60L 53/68; B60L 53/66; B60L 2260/50; B60L 53/60; B60L 53/67; Y02T 10/70; Y02T 90/12; G07F 15/005
See application file for complete search history.

(56) References Cited

U.S. PATENT DOCUMENTS 10,906,414 B2     2/2021   Fong et al.
10,985,585 B2     4/2021   Hsieh et al.
(Continued)

FOREIGN PATENT DOCUMENTS

CN     1460215 A     12/2003
CN     108270635 A     7/2018
(Continued)

OTHER PUBLICATIONS

International Search Report for International Patent Application No. PCT/FI2022/050035 dated Apr. 19, 2022 (4 pages).
(Continued)

*Primary Examiner* — Santosh R Poudel
(74) *Attorney, Agent, or Firm* — Merchant & Gould P.C.

(57)     ABSTRACT
Various example embodiments relate to determining an online/offline status of an electric vehicle charging station. The charging station may be determined to be online for a period of time after reception of a message from the charging station. Further, probability (100) of the charging station for being online may be determined, and one or more actions may be initiated in response to the online probability decreasing below a predetermined threshold. A computing device (200,300), a method, a system and a computer program (306) are disclosed.

12 Claims, 3 Drawing Sheets

(56)        References Cited

U.S. PATENT DOCUMENTS

| | | | | |
|---|---|---|---|---|
| 2002/0143916 | A1* | 10/2002 | Mendiola | G06Q 10/107 709/223 |
| 2008/0049639 | A1 | 2/2008 | Wiley et al. | |
| 2010/0211643 | A1* | 8/2010 | Lowenthal | B60L 53/14 709/206 |
| 2011/0239116 | A1 | 9/2011 | Turner et al. | |
| 2014/0028681 | A1 | 1/2014 | Hirayama | |
| 2014/0316939 | A1* | 10/2014 | Uyeki | B60L 3/12 705/26.9 |
| 2016/0366084 | A1* | 12/2016 | Malahy | G10L 13/02 |
| 2018/0186245 | A1 | 7/2018 | Diaz et al. | |
| 2019/0152339 | A1 | 5/2019 | Lowenthal et al. | |
| 2020/0104161 | A1* | 4/2020 | Kapur | G06F 11/2041 |
| 2020/0162434 | A1* | 5/2020 | Tang | H04L 69/40 |
| 2020/0189407 | A1 | 6/2020 | Fong et al. | |
| 2021/0029065 | A1* | 1/2021 | Erhart | H04L 51/02 |

FOREIGN PATENT DOCUMENTS

| | | | |
|---|---|---|---|
| CN | 109813982 A | * | 5/2019 |
| CN | 110646699 A | | 1/2020 |
| CN | 111319485 A | | 6/2020 |
| EP | 3343726 A1 | | 7/2018 |
| FI | 128774 B | | 11/2020 |
| FR | 3041782 A1 | | 3/2017 |
| JP | 2008-015722 A | | 1/2008 |
| JP | 2012-518239 A | | 8/2012 |
| JP | 2018-109975 A | | 7/2018 |
| JP | 2019-176717 A | | 10/2019 |
| WO | 2021089914 A1 | | 5/2021 |

OTHER PUBLICATIONS

Written Opinion of the International Searching Authority for International Patent Application No. PCT/FI2022/050035 dated Apr. 19, 2022 (7 pages).

Finnish Office Action for Application No. 20215065 dated Apr. 22, 2021 (7 pages).

Finnish Office Action for Application No. 20215065 dated Sep. 13, 2021 (6 pages).

Finnish Search Report dated Apr. 22, 2021 for Application No. 20215065 (2 pages).

Bulaeva, V., "Key performance indicators and their visualization in an electric vehicle charging company" LUTPub [online], May 2019, [retrieved on Apr. 16, 2021]. Retrieved from <http://urn.fi/URN:NBN:fife2019052417002 (76 pages).

OCPP 2.0, Part 2—Specification. SmartCharge [online], Apr. 2018, [retrieved on Apr. 16, 2021]. Retrieved from <https://smartcharge.com.br/artigos/ocpp/OCPP-2.0_part2_specification.pdf>.

Zheng, K. et al., "The Analysis and Implementaton of Alljoyn Based Thin Client Communication System With Heartbeat Function" In: IET [online], May 14, 2015, [retrieved on Apr. 16, 2021]. Retrieved from <https://ieeexplore.ieee.org/document/7106792>, <DOI:10.1049/cp.2014.1293 (4 pages).

Japanese Office Action dated Oct. 8, 2024 for Japanese Application No. 2023-542012 (5 pages including English Translation).

Naohiro Hayashibara, "Implementation and Performance Evaluation of the ACCMOS Failure Detector", Transactions of Information Processing Society of Japan, 2010, 51(12):2310-2318.

Office Action dated Jul. 29, 2025 for the corresponding Chinese Patent Application No. 202280010826.9 (22 pages including English Translation).

* cited by examiner

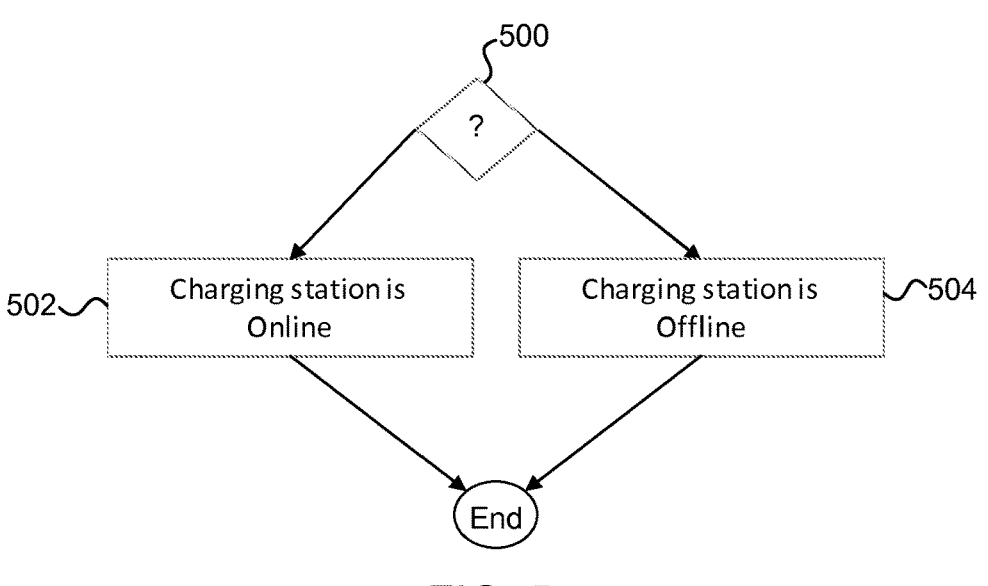

500

?

502 — Charging station is Online

Charging station is Offline — 504

End

FIG. 5

400 — New message from an EV charging station

402 — Online probability = 100%

600 — Online probability function

404 — Set online expiration time

New message?

602 — Yes / No

604 — Check online probability once a minute

608 — Try to send a message to the charging station, any reply?

Reply received

No reply

610 — Try to reboot the charging station, any reply?

No reply

606 — <50% — No / Yes

End

612 — Alert maintence person

FIG. 6

METHOD FOR DETERMINING A STATUS OF AN ELECTRIC VEHICLE CHARGING STATION

CROSS-REFERENCE TO RELATED APPLICATIONS

This application is a National Stage Application of PCT/FI2022/050035, filed 20 Jan. 2022, which claims benefit of application No. 20215065, filed 20 Jan. 2021 in Finland, and which applications are hereby incorporated by reference in their entireties. To the extent appropriate, a claim of priority is made to each of the above disclosed applications.

TECHNICAL FIELD

Various example embodiments generally relate to the field of electric vehicle charging stations. In particular, some example embodiments relate to determining if the electric vehicle charging station is online or offline.

BACKGROUND

Electric vehicle charging stations may be connected to a charging station management system (CSMS) through Internet using various different communication protocols. For various reasons, a charging station may sometimes lose the connection and go offline. It may be important to determine quickly and in a reliable way when a charging station is offline. However, it may not be easy to tell what a status of the charging station is when there may be tens of thousands of charging stations, hundreds of different models and several different communication protocols, all working in different ways.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide a method and a device for determining if an electric vehicle charging station is online or offline. The electric vehicle charging station may be determined to be offline by default. A temporary online time may be determined for the electric vehicle charging station. After a reception of a message, such as a heartbeat, from the electric vehicle charging station, the temporary online time period may be set with an expiration time. In an embodiment, a probability for the electric vehicle charging station being online may be determined. The temporary online time period may last until the probability function reaches, for example, zero percent. A predetermined threshold may be set for the probability to trigger one or more actions, such as to alert maintenance or perform measurements on the electric vehicle charging station. A more reliable and a simple method for determining the online/offline status of the charging station may be provided. The objective is achieved by the features of the independent claims. Some embodiments are described in the dependent claims.

According to a first aspect, a method is provided. The method may comprise determining an online time period for an electric vehicle charging station based on a latest message received from the electric vehicle charging station; determining an online expiration time for the online time period based on a timestamp of the latest message and a message interval of the electric vehicle charging station during which at least one message is expected from the electric vehicle charging station; and determining the electric vehicle charging station is online based on the online expiration time being greater than a current time.

According to an embodiment, the online expiration time is determined based on a time elapsed since the timestamp of the latest message being equal to the message interval times a number of messages not received from the charging station within one or more message intervals since the timestamp of the latest message.

According to an embodiment, in addition or alternatively, the message comprises a heartbeat.

According to an embodiment, in addition or alternatively, the method may further comprise determining an online probability for the electric vehicle charging station based on a time difference between the time elapsed since the timestamp of the latest message and the message interval times the number of messages not received from the electric vehicle charging station within one or more message intervals; and initiating at least one action when the online probability is below a predetermined threshold.

According to an embodiment, the online probability is 100% at the time of the timestamp of the latest message and the online probability decreases after the timestamp such that the online probability is 0% at the online expiration time.

According to an embodiment, in addition or alternatively, the predetermined threshold is 50%.

According to an embodiment, in addition or alternatively, the online probability is checked at predetermined intervals.

According to an embodiment, in addition or alternatively, the at least one action comprises sending a message to the electric vehicle charging station.

According to an embodiment, in addition or alternatively, the at least one action comprises attempting to reboot the electric vehicle charging station.

According to an embodiment, in addition or alternatively, the at least one action comprises alerting a maintenance person.

According to an embodiment, in addition or alternatively, the maintenance person is alerted after no reply is received from the electric vehicle charging station in response to at least one of the sent message to the electric vehicle charging station or the attempted reboot.

According to an embodiment, in addition or alternatively, the online probability is determined to be 0% in response to a closed socket connection.

According to a second aspect, a computing device is provided. The computing device may comprise at least one processor; and at least one memory including computer program code; the at least one memory and the computer code configured to, with the at least one processor, cause the computing device at least to determine an online time period for an electric vehicle charging station based on a latest message received from the electric vehicle charging station; determine an online expiration time for the online time period based on a timestamp of the latest message and a message interval of the electric vehicle charging station during which at least one message is expected from the electric vehicle charging station; and determine the electric vehicle charging station is online based on the online expiration time being greater than a current time. The computing device may be further configured to perform any embodiment of the method of the first aspect.

According to a third aspect, system for managing electric vehicle charging stations is provided, comprising a computing device according to the second aspect and at least one electric vehicle charging station configured to be communicatively coupled with the computing device.

According to a fourth aspect, a computer program is configured, when executed by a computing device, to cause the computing device at least to determine a an online time period for an electric vehicle charging station based on a latest message received from the electric vehicle charging station; determine an online expiration time for the online time period based on a timestamp of the latest message and a message interval of the electric vehicle charging station during which at least one message is expected from the electric vehicle charging station; and determine the electric vehicle charging station is online based on the online expiration time being greater than a current time. The computer program may be further configured, when executed by the computing device, to cause the computing device to perform any embodiment of the method of the first aspect.

Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to explain the example embodiments. In the drawings:

FIG. 5 illustrates an example of a flow chart for determining if an electric vehicle charging station is offline or online, according to an example embodiment;

FIG. 6 illustrates an example of a flow chart for determining if an electric vehicle charging station is offline to enable early alerts, according to an example embodiment.

In the following, like reference numerals are used to designate like parts in the accompanying drawings.

DETAILED DESCRIPTION

Figure 1:
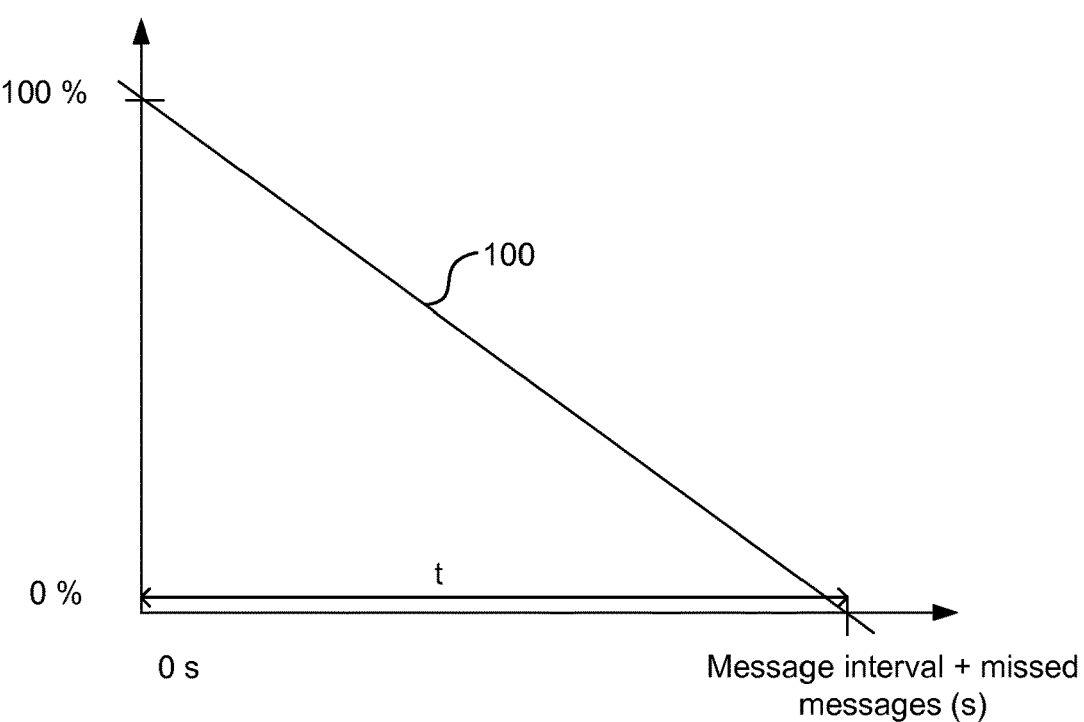
FIG. 1 illustrates an example of an online probability function of an electric vehicle charging station, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

An offline status of an electric vehicle charging station may be determined, for example, based on heartbeats or a socket status. A heartbeat may be a protocol data unit configured for ensuring that the CSMS knows that the electric vehicle charging station is still alive, i.e. online and/or functional. The heartbeats may be sent by the electric vehicle charging station based on a configured heartbeat interval. An electric vehicle charging station may send the heartbeat, for example, every 30 seconds, once a minute, every 5 minutes, or every 15 minutes to the CSMS.

The CSMS may monitor if it has not received heartbeats from the electric vehicle charging station lately. The lack of received heartbeats may mean the electric vehicle charging station has gone offline. The offline status of the electric vehicle charging station may be determined, for example, based on two configurations: the heartbeat interval (e.g. seconds between heartbeats) and a number of missed heartbeats. A heartbeat is missed when it is not received, for example by the CSMS, within the configured heartbeat interval. The CSMS may keep track on when it received the latest heartbeat. If an elapsed time since a timestamp of the latest heartbeat is equal or smaller than the heartbeat interval times the missed heartbeats (time since last heartbeat≤heartbeat interval×number of missed heartbeats), the electric vehicle charging station may be set to be offline.

In other words, the electric vehicle charging stations may be determined to be online by default, and the electric vehicle charging stations may be updated to be offline according to the configuration if they do not send heartbeats. In an alternative configuration, a socket-connection (e.g. a web-socket or a TCP socket) may be opened from the electric vehicle charging station to the CSMS and the connection may indicate a status of the electric vehicle charging station. If the socket connection is open, the electric vehicle charging station may be online. If the socket connection is closed, the electric vehicle charging station may be offline. Further, a combination of the heartbeats and the socket-connection may be used. The electric vehicle charging station may be determined to be online if a socket-connection is open and heartbeats are received, otherwise the electric vehicle charging station may be offline.

However, for example the socket-based monitoring may not be alone reliable. Even if the socket-connection is open, it is possible that the electric vehicle charging station's software may be malfunctioning, and the electric vehicle charging station may not be able to process messages.

The above described heartbeat monitoring may not be reliable either. For example, if the electric vehicle charging station should send a heartbeat once a minute, and the heartbeat is not received for 1.5 minutes, it is uncertain whether the electric vehicle charging station is offline or not. Moreover, monitoring the online/offline status by the CSMS may require a lot of processing power. When there are for example tens of thousands of electric vehicle charging stations to be monitored with different configurations, tens of thousands of calculations may be needed constantly to determine if there has been too long time since the latest heartbeat. Reliability of the monitoring may rely on a working CSMS monitoring program that calculates the time since the latest heartbeat. If there is a malfunction in the CSMS monitoring system, the electric vehicle charging stations may not be set offline, even if they may be offline in reality.

According to an example embodiment, a more reliable method for determining an online and an offline status of an electric vehicle charging station may be provided. In addition, less processing power may be required for determining the status.

In an embodiment, an offline status of an electric vehicle charging station may be determined based on a reliability function instead of a binary state wherein the charging station is either online or offline. The electric vehicle charging stations may be determined to be offline by default. Further, a message received from, the electric vehicle charging station may trigger a time period for which a probability for the charging station of being online is calculated. The electric vehicle charging stations may be temporarily online, for example, when the online probability is higher than 0%. In an embodiment, when the probability decreases below a certain threshold, it may be determined the electric vehicle charging station is offline. This may enable informing maintenance and users about possible offline states of electric vehicle charging stations in advance based on the probability.

Figure 2:
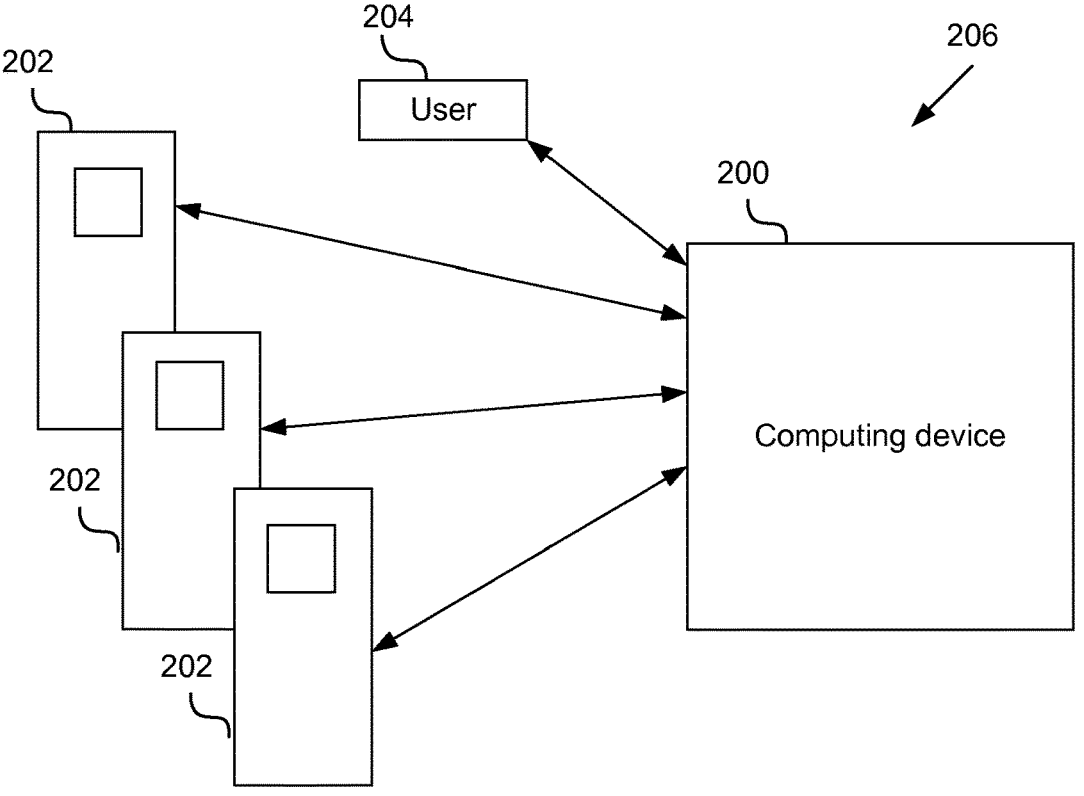
FIG. 2 illustrates an example of a system for managing electric vehicle charging stations, according to an example embodiment.

FIG. 1 illustrates an example of an online probability function for an online status of an electric vehicle charging station, according to an example embodiment. The probabilities may be calculated and monitored by a computing device. FIG. 2 illustrates an example embodiment of a system 206 for managing electric vehicle charging stations comprising the computing device 200. The system 206 may further comprise one or more electric vehicle charging stations 202. An electric vehicle charging station may refer to a device that may be used to charge an electric vehicle, such as an electric car. The electric vehicle charging station 202 may be configured to send messages to the computing device at predetermined message intervals, for example, to indicate it is operational. The computing device 200 may be communicatively coupled to the electric vehicle charging stations 202. The computing device 200 may be further configured to communicate with one or more users 204 via user devices. The user devices may comprise other computing devices, for example, mobile devices such as mobile phones. The user 204 may be, for example, a driver of an electric vehicle or an operator of an electric vehicle charging station 202. The computing device 200 may communicate with the electric vehicle charging stations 202 and/or the user 204 using, for example, data connection. The data connection may comprise, for example, a wireless connection or a wired connection. The computing device 200 may be implemented as a part of a backend system. The backend system may comprise, for example, a plurality of servers and the computing device 200 may correspond to one or more of those servers.

In an embodiment, a probability 100 that the electric vehicle charging station 202 is online may be determined to be 100% at the exact moment when a heartbeat or some other message from the electric vehicle charging station 202 is received by the computing device 200. After reception of the heartbeat or other message, the online probability 100 of the electric vehicle charging station 202 may start to decline until a new message is received from the electric vehicle charging station 202. In an embodiment, the online probability 100 may decrease linearly to 0% when any message is not received from the electric vehicle charging station 202 within a certain online time period t.

The online time period t may start according to a timestamp of the last received message, such as the heartbeat. In an embodiment, the online time period t may end at an online expiration time determined based on the timestamp of the latest received message, a configured message interval and a number of messages not received within one or more message intervals since the timestamp. The online probability 100 may be determined to be 0% when the online expiration time is met.

In an embodiment, the online expiration time may correspond to a time wherein a time since receipt of the latest received message corresponds to the message interval times the number of missed messages. In an embodiment, the message interval may be a heartbeat interval of the electric vehicle charging station 202 and the missed messages may comprise heartbeats. The online probability of the electric vehicle charging station 202 may be determined to be 0% also when a socket-based protocol closes a socket connection between the electric vehicle charging station 202 and the computing device 200.

The online probability function may be as follows, according to an example embodiment:

$$x=((hbi*mh)-thb)/(hbi*mh)$$

$$y=100\%*x,$$

wherein hbi is the heartbeat interval, mh is the missed heartbeats and thb is a time since the last heartbeat (or some other message). Alternatively, the probability function may be calculated based on the message interval and a number of missed messages, wherein one message is configured to be sent during one message interval. According to an example embodiment, a message interval may be 60 seconds, a number of missed messages may be 3 and a time since the latest received message may be 120 seconds. The online probability for the charging station may thus be:

$$=100\%*(60*3-120)/60*3$$

$$=100\%*60/180$$

$$=100\%*0,33=33\%.$$

A benefit of the online probability function for estimating the online status is a need for significantly less processing power. Further, better reliability for estimating the online/offline status of electric vehicle charging stations may be achieved. The improved reliability may be achieved as the method may not be as vulnerable for malfunctions. The computing device may enable earlier reaction to possible issues with the electric vehicle charging stations based on the online probability.

In an embodiment, a message from an electric vehicle charging station 202 may be received at 12:00. Based on the online probability function calculated by the computing device 200, it may be known that the electric vehicle charging station 202 reaches 0% online probability at 12:08. Therefore, the online expiration time for the online time period t may be set to 12:08. After determining the online expiration time, there may be no need to make any more calculations. In order to determine which electric vehicle charging stations are online, it may be simply checked which electric vehicle charging stations have their online expiration time later than the current time. The electric vehicle charging station 202 may be automatically determined to be offline after the expiration time at 12:08. The computing device 200 may be configured to alert maintenance in response to the offline status of the charging station 202.

The solution may increase reliability since in a case of a problem, for example if there would be a failure in calculations by the computing device 200, the electric vehicle charging station 202 may be determined to be offline based on the online probability function. If the electric vehicle charging station 202 was determined to be online by default, the electric vehicle charging station 202 may remain online forever in case of a failure, showing false information to users. Also, the offline status may be updated immediately without substantial delay and notified for users, for example, in mobile apps. In an embodiment, drivers of electric vehicles may be notified that they cannot use the offline station. Further, a notification may be sent to technical maintenance indicating that something is wrong with the offline station.

Figure 3:
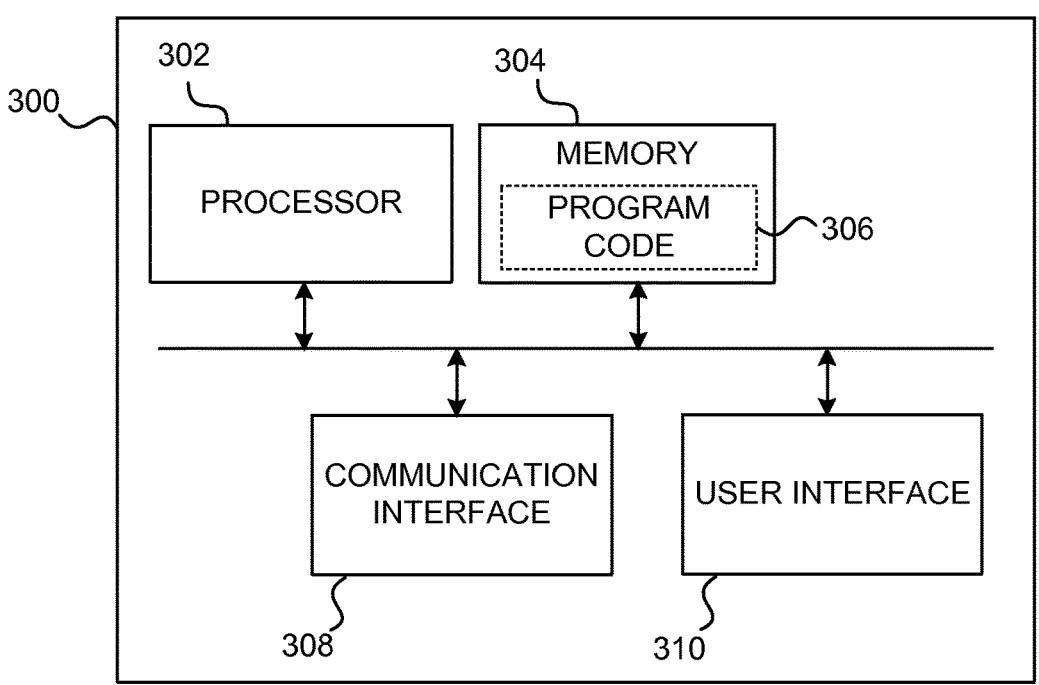
FIG. 3 illustrates an example of a device configured to practice one or more example embodiments, according to an example embodiment.

FIG. 3 illustrates an example of a device 300 configured to practice one or more example embodiments, according to an example embodiment. The device 300 may be, for example, the computing device 200.

The device 300 may comprise at least one processor 302. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 300 may further comprise at least one memory 304. The memory 304 may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The device 300 may further comprise communication interface 308 configured to enable the device 300 to transmit and/or receive information, to/from other devices. The communication interface 308 may be configured to provide at least one wireless radio connection, such as for example a 3GPP mobile broadband connection (e.g. 3G, 4G, 5G). However, the communication interface 208 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface 308 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The device 300 may further comprise a user interface 310 comprising an input device and/or an output device. The input device may take various forms such a keyboard, a touch screen, or one or more embedded control buttons. The output device may for example comprise a display, a speaker, a vibration motor, or the like.

When the device 300 is configured to implement some functionality, some component and/or components of the device, such as for example the at least one processor 302 and/or the memory 204, may be configured to implement this functionality. Furthermore, when the at least one processor 302 is configured to implement some functionality, this functionality may be implemented using program code 306 comprised, for example, in the memory 304.

The functionality described herein may be performed, at least in part, by one or more computer program product components such as software components. According to an embodiment, the device comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The device 300 comprises means for performing at least one method described herein. In one example, the means comprises the at least one processor 302, the at least one memory 304 including program code 306 configured to, when executed by the at least one processor 302, cause the device 300 to perform the method.

The device 300 may comprise for example a computing device such as for example a server device, a client device, a mobile phone, a tablet computer, a laptop, or the like. In one example, the device 300 may comprise an electric vehicle charging station. Although the device 300 is illustrated as a single device it is appreciated that, wherever applicable, functions of device 300 may be distributed to a plurality of devices. In an embodiment, the device 300 may comprise a CSMS.

Figure 4:
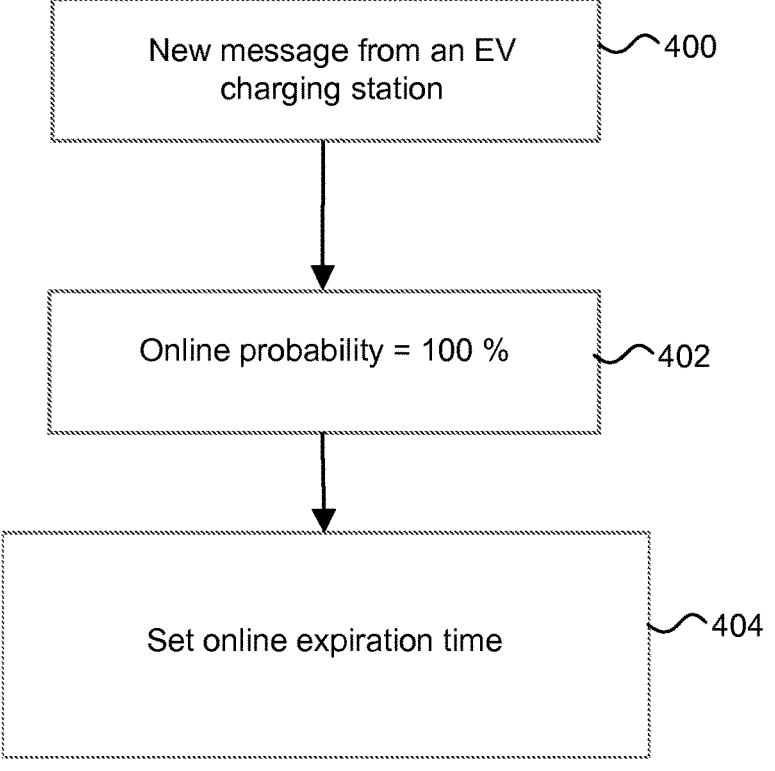
FIG. 4 illustrates an example of a flow chart for calculating online expiration time, according to an example embodiment.

FIG. 4 illustrates an example of a flow chart for calculating an online expiration time, according to an example embodiment. The procedure of FIG. 4 may be executed, for example, by the computing device 200.

At 400, a new message may be received from an electric vehicle charging station. The message may be, for example, a heartbeat.

At 402, probability of the electric vehicle charging station for being online may be determined to be 100%. The online probability may be 100% immediately after the new message is received. The online probability may linearly decrease when a time from the reception of the message increases.

At 404, the online expiration time may be set. The online expiration time may be determined based on a time of reception of the most recently received message. The online expiration time may be determined based on a message interval of the electric vehicle charging station. The online expiration time may be further determined based on number of missed messages from the electric vehicle charging station. The electric vehicle charging station may be configured to send messages to the computing device 200 at regular intervals. The missed message is a message which is expected from the electric vehicle charging station but not received by the computing device within the message interval. For example, within three message intervals of the electric vehicle charging station, three messages may be expected. If the computing device 200 receives only 1 message within the three message intervals, the number of missed messages may be two. In an embodiment, the online expiration time may be the message interval times the missed messages.

FIG. 5 illustrates an example of a flow chart for determining if an electric vehicle charging station is offline or online, according to an example embodiment. The procedure of FIG. 5 may be executed, for example, by the computing device 200.

At 500, it may be determined if an online expiration time of the electric vehicle charging station is greater than current time. The online expiration time may be determined as presented above. At 502, if the online expiration time is greater than the current time, the electric vehicle charging station may be determined to be online. At 504, if the online expiration time is not greater than the current time, the electric vehicle charging station may be determined to be offline. In an embodiment, a timestamp of a latest message received from the electric vehicle charging station is at 15:05. Based on the timestamp and configuration of the electric vehicle charging station, the online expiration time may be determined to be at 15:17. The electric vehicle charging station may be determined to be online between 15:05 and 15:17. When the current time exceeds the online expiration time at 15:17, the electric vehicle charging station may be determined to be offline. When a new message is received, the online time period may restart based on a timestamp of the new message. Hence, a simple and reliable method for determining the status of the electric vehicle charging station may be provided.

FIG. 6 illustrates an example of a flow chart for determining if an electric vehicle charging station is offline to enable early alerts, according to an example embodiment. The procedure of FIG. 6 may be executed, for example, by the computing device 200. Operations 400, 402 and 404 correspond to the operations presented in FIG. 4.

At 600, a time of reception of the new message received from, the electric vehicle charging station at 400 may be input to an online probability function. The online probability function may be implemented as described above. At the time of receipt of the new message, the probability of the electric vehicle charging station for being online may be determined to be 100% at 402. The online probability may be determined to decrease between the time of reception of the latest message and an online expiration time determined at 404. The probability function may decline linearly. At 602, the computing device 200 may check if any new messages are received from, the electric vehicle charging station. If yes, the process may return to 400.

If no new messages are received from the electric vehicle charging station, at 604, the computing device 200 may be configured to check the online probability of the electric vehicle charging station. The online probability may be checked, for example, every seconds, every 30 seconds, once a minute, every 5 minutes, every 10 minutes, or any other time within a range of 0-30 minutes.

In an embodiment, the computing device 200 may be configured to make an alert when it is determined that it is more probable that the electric vehicle charging station is offline than online. If the alert was made after the electric vehicle charging station goes offline, instead of based on the probability, this may result long waiting times in at least some cases. Further, the computing device 200 may be configured to try to make some automatic fixes to the charging station before sending the alert.

For example, an electric vehicle charging station may have a 10 minutes message interval and a setting of 3 missed messages before the electric vehicle charging station is considered to be offline. Hence, a maintenance person may be alerted that there is something wrong with the electric vehicle charging station after 30 minutes of no received messages. Further, the maintenance person may have a reaction time of 15 minutes before the alert is noticed and reacted to. This means that it may take as long as 45 minutes after the problem may have first occurred before somebody starts to investigate the problem. The total time may be too long for a critical infrastructure.

At 606, the computing device 200 may determine if the online probability is less than 50%. In an embodiment, there may have not been a message from the electric vehicle charging station in 15 minutes. Based on the time of the receipt of the most recently received message, the computing device 200 may determine that there is only 50% probability that the charging station is still online. If the online probability is equal to or greater than 50%, the process may return to 604. When the online probability has decreased below 50%, the computing device 200 may be configured to try to contact the electric vehicle charging station by sending a message to it at 608.

Thereafter, the computing device 200 may wait a predetermined time if the electric vehicle charging station reacts to the message. In addition, or alternatively, the computing device 200 may try to remotely reboot the electric vehicle charging station at 610 to see if rebooting solves the situation. When rebooted, the electric vehicle charging station may be shut down and restarted. If no response is received from the electric vehicle charging station in response to the message and/or reboot, the computing device 200 may be configured to send the alert to the maintenance person at 612. The alert may indicate that something might be wrong the specific charging station.

If the electric vehicle charging station sends a reply at 608 or 610, the process may return to 400. The process may return to 400 at any time when a message is received by the computing device 200 from the electric vehicle charging station.

The online probability function may be used to automatically solve different issues on an electric vehicle charging station. The probability function may enable early alerts to maintenance personnel about possible issues on the electric vehicle charging stations.

Further features of the method(s) directly result for example from functionalities of the computing device described throughout the specification and in the appended claims and are therefore not repeated here. Different variations of the method(s) may be also applied, as described in connection with the various example embodiments. It is obvious to a person skilled in the art that with the advancement of technology, the basic idea of the disclosure may be implemented in various ways. The disclosure and the embodiments are thus not limited to the examples described above, instead they may vary within the scope of the claims.

A computing device may be configured to perform or cause performance of any aspect of the method(s) described herein. Further, a computer program may comprise instructions for causing, when executed, a device to perform any aspect of the method(s) described herein. Further, a device may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

The terms 'automated', 'automatically', 'automatic' and variations thereof, as used herein, may refer to any process or operation done without human input when the process or operation is performed. However, a process or operation can be automatic, even though performance of the process or operation uses human input, if the input is received before performance of the process or operation.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A method, the method comprising:

determining a start of an online time period for an electric vehicle charging station based on a latest message received from the electric vehicle charging station;

determining an online expiration time for the online time period based on a timestamp of the latest message and a message interval of the electric vehicle charging station during which at least one message is expected from the electric vehicle charging station;

determining the electric vehicle charging station is online based on the online expiration time being greater than a current time;

based on the latest message, determining an online probability for the electric vehicle charging station, the online probability indicating that the electric vehicle charging station is online having values between 0% and 100%; and based on a predetermined threshold of the determined online probability, initiating at least one action, wherein the initiating at least one action comprises rebooting the electric vehicle charging station, wherein the online expiration time is determined based on a time elapsed since the timestamp of the latest message being equal to the message interval times a number of messages not received from the electric vehicle charging station within one or more message intervals since the timestamp of the latest message.

2. The method of claim 1, wherein the method comprises:

determining the online probability for the electric vehicle charging station based on a time difference between the time elapsed since the timestamp of the latest message and the message interval times the number of messages not received from the electric vehicle charging station within one or more message intervals; and initiating the at least one action when the online probability is below the predetermined threshold.

3. The method of claim 2, wherein the predetermined threshold is 50%.

4. The method of claim 2, wherein the at least one action comprises alerting a maintenance person.

5. The method of claim 4, wherein the maintenance person is alerted after no reply is received from the electric vehicle charging station in response to at least one of sending a message to the electric vehicle charging station or an attempted reboot.

6. The method of claim 1, wherein the message comprises a heartbeat.

7. The method of claim 1, wherein the online probability is 100% at the timestamp of the latest message and the online probability decreases after the timestamp such that the online probability is 0% at the online expiration time.

8. The method of claim 1, wherein the online probability is checked at predetermined intervals.

9. The method of claim 1, wherein the at least one action comprises sending a message to the electric vehicle charging station.

10. The method of claim 1, wherein the online probability is determined to be 0% in response to a closed socket connection.

11. A computing device, the computing device comprising:

at least one processor; and at least one memory including computer program code;

the at least one memory and the computer code configured to, with the at least one processor, cause the computing device at least to:

determine an online time period for an electric vehicle charging station based on a latest message received from the electric vehicle charging station;

determine an online expiration time for the online time period based on a timestamp of the latest message and a message interval of the electric vehicle charging station during which at least one message is expected from the electric vehicle charging station;

determine the electric vehicle charging station is online based on the online expiration time being greater than a current time, the computer code configured to, with the at least one processor, cause the computing device at least to:

based on the latest message, determine an online probability for the electric vehicle charging station, the online probability indicating that the electric vehicle charging station is online having values between 0% and 100%; and based on a predetermined threshold of the determined online probability, initiate at least one action, wherein the initiate at least one action comprises rebooting the electric vehicle charging station, wherein the online expiration time is determined based on a time elapsed since the timestamp of the latest message being equal to the message interval times a number of messages not received from the electric vehicle charging station within one or more message intervals since the timestamp of the latest message.

12. A system for managing electric vehicle charging stations comprising a computing device according to claim 11 and at least one electric vehicle charging station configured to be communicatively coupled with the computing device.

* * * * *